United States Patent
Eberhard

(10) Patent No.: US 8,532,845 B2
(45) Date of Patent: Sep. 10, 2013

(54) METHOD OF MONITORING THE EFFECTIVENESS OF A DAMPER, AND A DEVICE FOR IMPLEMENTING SAID METHOD

(75) Inventor: Alain Eberhard, Velaux (FR)

(73) Assignee: Europcopter, Marignane Cedex (FR)

( * ) Notice: Subject to any disclaimer, the term of this patent is extended or adjusted under 35 U.S.C. 154(b) by 197 days.

(21) Appl. No.: 13/156,565

(22) Filed: Jun. 9, 2011

(65) Prior Publication Data

US 2011/0307125 A1   Dec. 15, 2011

(30) Foreign Application Priority Data

Jun. 14, 2010   (FR) .................................... 10 02505

(51) Int. Cl.
*G01M 17/00*   (2006.01)

(52) U.S. Cl.
USPC ............ 701/3; 701/34.4; 73/11.04; 73/11.05; 73/583

(58) Field of Classification Search
USPC ..................... 701/3, 34.4; 702/56; 73/11.04, 73/11.05, 583
See application file for complete search history.

(56) References Cited

U.S. PATENT DOCUMENTS

| 3,080,803 | A | | 3/1963 | Uno |
| 3,620,069 | A | * | 11/1971 | Cole, Jr. ........................... 73/583 |
| 4,211,105 | A | * | 7/1980 | Szabo et al. .................. 73/11.05 |
| 4,574,642 | A | | 3/1986 | Fleischman |
| 4,905,506 | A | * | 3/1990 | Lebershausen ............ 73/114.77 |
| 5,227,982 | A | * | 7/1993 | Kipple et al. ................... 702/56 |
| 5,383,133 | A | * | 1/1995 | Staple .......................... 700/280 |
| 6,257,063 | B1 | * | 7/2001 | Uhlig ............................. 73/579 |
| 6,742,381 | B2 | * | 6/2004 | Maeno ......................... 73/11.01 |
| 7,085,655 | B2 | * | 8/2006 | Ferrer ............................ 702/35 |
| 7,360,994 | B2 | * | 4/2008 | Zoppitelli ..................... 416/107 |
| 7,363,120 | B2 | * | 4/2008 | Aubourg .......................... 701/3 |
| 2003/0002686 | A1 | | 1/2003 | Millott |
| 2006/0149494 | A1 | * | 7/2006 | Venter et al. .................. 702/141 |
| 2009/0324409 | A1 | * | 12/2009 | Volanthen et al. .............. 416/61 |

FOREIGN PATENT DOCUMENTS

| DE | 4129599 | A1 | * | 3/1993 |
| EP | 220985 | A1 | * | 5/1987 |
| FR | 2867152 | A1 | | 9/2005 |
| JP | 06170769 | A | * | 6/1994 |

OTHER PUBLICATIONS

Ganguli, Ranjan, "Health Monitoring of a Helicopter Rotor in Forward Flight Using Fuzzy Logic", AIAA Journal, vol. 40 No. 12, Dec. 2002, pp. 2373-2381.*

(Continued)

*Primary Examiner* — James Trammell
*Assistant Examiner* — David Testardi
(74) *Attorney, Agent, or Firm* — Brooks Kushman P.C.

(57) ABSTRACT

The present invention relates to a method of monitoring the effectiveness of a damper system, wherein the method consists in measuring the relative movements of two strength members, in filtering the measurements in order to isolate those that relate to the lead-lag resonant frequency of the blade, in rectifying the signal, in recording the signal, in comparing the rectified signal (S) with a threshold value ($S_L$), in determining an initial time interval ($T_0$) as soon as the rectified signal exceeds the threshold value ($S_L$), in calculating the integrals of the signal from $T_0$ to $T_0+\delta$ and from $T_0$ to $T_0+p\delta$, in calculating the ratio R of the integrals, and in comparing the ratio R with a limit value $R_L$, and in activating and delivering an alert signal ($V_1$) if the ratio R is greater than or equal to the limit value $R_L$.

16 Claims, 2 Drawing Sheets

(56) References Cited

OTHER PUBLICATIONS

Alkahe, Jonathan et al., "Helicopter Rotor Health Monitoring Using Adaptive Estimation", Proceedings of the American Helicopter Society 57th Annual Forum, Washington D.C., May 9-11, 2001, pp. 1280ff.*
EPO machine translation of EP 220985 A.*
JPO machine translation of JP 06-170769 A.*
EPO machine translation of EP 220985 A (original EP document published May 6, 1987).*
JPO machine translation of JP 06-170769 A (original JP document published Jun. 21, 1994).*
Search Report and Written Opinion; Application No. FR 1002505; dated Apr. 4, 2011.

* cited by examiner

METHOD OF MONITORING THE EFFECTIVENESS OF A DAMPER, AND A DEVICE FOR IMPLEMENTING SAID METHOD

CROSS REFERENCE TO RELATED APPLICATIONS

This application claims the benefit of FR 10 02505 filed on Jun. 14, 2010, the disclosure of which is incorporated in its entirety by reference herein.

BACKGROUND OF THE INVENTION (1) Field of the Invention

The present invention relates to the general technical field of mechanical damping, and more particularly to the technical field of equipment used in aviation and including damper systems.

The invention is applicable in any damper system when a loss in damping characteristics might lead to a catastrophic event. The invention thus applies most particularly to lead-lag dampers used on a helicopter rotor, e.g. a main rotor or an anti-torque motor.

(2) Description of Related Art

By way of example, on a helicopter rotor that is said to be "soft in-plane", a lead-lag damper system connects each blade to the hub of the rotor or connects together two consecutive blades.

Such a damper serves to avoid catastrophic coupling between the lead-lag movements of the blades and the helicopter airframe. These phenomena are known as "ground resonance" and as "air resonance".

Such a damper is subjected to forced movements at the frequency of rotation of the rotor due to the pitch, flapping, and drag movements of the blade. The damper has very little effect on these movements.

The damper is also subjected to movements at the lead-lag resonant frequency of the blade. These movements are not naturally damped, e.g. by aerodynamic forces. Consequently, the damper serves to oppose any resonant phenomena.

It is essential to ensure that such a damper or damper system is in a good state of operation.

The present invention thus relates to means for ensuring that the damping characteristics of the damper system are indeed capable of being satisfactory. The invention thus relates to viscoelastic dampers and also to other types of damper, e.g. hydraulic dampers, by providing means for monitoring the absence of any hydraulic fluid leakage that would be harmful to proper operation of said dampers.

It is known, in particular from document FR 2 867 152, to control a lead-lag damper by adjusting its damping characteristics as a function of measured vibration so as to optimize energy dissipation. Such a method is dedicated to specific dampers and is technically complex. In addition, such a method is not designed to identify a loss of damper effectiveness.

Also known, e.g. from document U.S. Pat. No. 3,080,803, is a bench for measuring crack propagation in a test piece made of an elastic material. Crack monitoring is performed by special lighting and by making use of images obtained by means of a camera. The operation consists in periodically measuring crack size and is time consuming, and it also requires a large amount of know-how on the part of an operator.

Document U.S. Pat. No. 4,574,642 discloses a method that characterizes an elastomer by analyzing the movements of a mass in a vibration mode. Such a method serves to determine the stiffness and the damping of an elastomer once the excitation frequency and the excited mass are known.

With known methods, when the observed cracks reach a certain size, the damper is replaced. That generally requires the damper to be dismantled during a maintenance operation.

Consequently, those methods are not suited to helicopter rotor dampers since the forces to which the blades are subjected and the corresponding frequencies are not accurately identifiable. Those methods are also not applicable to rotor-mounted dampers or damper systems while they are in operation.

SUMMARY OF THE INVENTION

Consequently, the object of the present invention is to verify the effectiveness of a rotor damper or damper system in a manner that is simple and reliable and to decide that it needs replacing, when appropriate.

An object of the present invention is thus to provide a novel monitoring method making it possible to overcome the above-mentioned limitations and to determine the wear state of a rotor damper or damper system.

Another object of the present invention is to propose a novel method of monitoring the effectiveness of a rotor damper or damper system that does not require said damper or damper system to be dismantled.

Another object of the present invention seeks to provide a novel device for monitoring the effectiveness of a damper or damper system that does not present the above-mentioned drawbacks and that is simple, reliable, and inexpensive to implement.

The objects given to the invention are achieved with the help of a method of monitoring the effectiveness of a damper system for damping the movement components of equipment of the aircraft that result from the lead-lag resonant frequency of said equipment, said damper system comprising two strength members that are movable relative to each other and that are connected together by a damper member, wherein the method consists in:

a) measuring the relative movements of the two strength members;

b) filtering the measurements to isolate those that relate to the lead-lag resonant frequency of the equipment;

c) rectifying the signal that results from the filtering;

d) recording the rectified signal;

e) comparing the rectified signal with a predetermined threshold value and returning to step a) so long as the rectified signal does not exceed said threshold value;

f) determining an initial time instant $T_0$ as soon as the rectified signal exceeds the threshold value;

g) calculating an integral $I_1$ of the rectified signal from $T_0$ to $T_0+\delta$, where $\delta$ is a predetermined time interval characteristic of the damped equipment;

h) calculating an integral $I_p$ of the rectified signal from $T_0$ to $T_0+\delta$, where p is an integer equal to 2, 3, 4, or 5;

i) calculating the ratio R where $R=I_p/I_1$;

j) comparing the ratio R with a predetermined limit value $R_L$;

k) returning to step a) if the ratio is less than the limit value $R_L$; and l) activating and delivering an alert instruction if the ratio R is greater than or equal to the limit value $R_L$, said alert instruction corresponding to a failure of the damper system.

The objects given to the invention are also achieved with the help of a method of monitoring the effectiveness of a damper system for damping the movement components of equipment of the aircraft that result from the lead-lag resonant frequency of said equipment, said damper system comprising two strength members that are movable relative to each other and that are connected together by a damper member, wherein the method consists in:

a) measuring the relative movements of the two strength members;

b) filtering the measurements to isolate those that relate to the lead-lag resonant frequency of the equipment;

c) rectifying the signal that results from the filtering;

d) recording the rectified signal;

e) comparing the rectified signal with a predetermined threshold value and returning to step a) so long as the rectified signal does not exceed said threshold value;

f) determining an initial time instant $T_0$ as soon as the rectified signal exceeds the threshold value;

g) calculating an integral $I_1$ of the rectified signal from $T_0$ to $T_0+\delta$, where $\delta$ is a predetermined time interval characteristic of the damped equipment;

h) calculating an integral $I_p$ of the rectified signal from $T_0+\delta$ to $T_0+(p+1)\delta$, where p is an integer equal to 2, 3, 4, or 5;

i) calculating the ratio R where $R=I_p/I_1$;

j) comparing the ratio with a predetermined limit value $R_L$;

k) returning to step a) if the ratio R is less than the limit value $R_L$; and l) activating and delivering an alert instruction if the ratio R is greater than or equal to the limit value $R_L$, said alert instruction corresponding to a failure of the damper system.

According to the invention, this ratio increases simultaneously with the appearance of a loss of damping characteristics and/or stiffness of the damper system.

In an implementation, the method of the invention consists in using an integer p=3.

In another implementation, the method in accordance with the invention consists in selecting one of the values 2, 3, 4, or 5 on the basis of a compromise determined experimentally during testing of the system as a whole.

The method in accordance with the invention is advantageously implemented continuously on equipment while it is in operation.

The method in accordance with the invention is advantageously applied to equipment of the rotor blade kind.

In an implementation, the method in accordance with the invention consists in using pre-established and recorded values for the lead-lag resonant frequency, for the threshold value, for the limit value $R_L$, and for the characteristic time $\delta$.

In an implementation of the method in accordance with the invention, the limit value $R_L$ is initially determined theoretically and is subsequently corrected as a function of experimental results from flight testing.

In an implementation, the method in accordance with the invention consists in monitoring the operating state of the means implementing said monitoring method and in delivering at least one additional alert signal in the event of malfunction.

In an implementation, the method in accordance with the invention consists in using a self-contained electrical power supply.

The objects given to the invention are also achieved with the help of a device for monitoring the effectiveness of a damper system for damping the movement components of aircraft equipment resulting from the lead-lag resonant frequency of said equipment, said damper system comprising two strength members that are movable relative to each other and connected together by means of a damper member, wherein the device comprises:

a self-contained power supply unit;

a movement sensor for measuring the relative movements of the strength members;

a bandpass filter for isolating the movement components of the strength members that result from the lead-lag resonant frequency;

a diode bridge for rectifying the signal delivered by the bandpass filter;

recording means including a memory for storing the rectified signal;

a comparator circuit for determining the time $T_0$ at which the value of the rectified and filtered signal exceeds a predetermined threshold value, making use of an additional memory and a clock;

an integrator circuit for calculating the integral $I_1$ of the signal from time $T_0$ to $T_0+\delta$ and the integral $I_p$ from $T_0$ to $T_0+p\delta$ or from $T_0+p\delta$ to $T_0+(p+1)\delta$, where p is an integer equal to 2, 3, 4, or 5, and where $\delta$ is a predetermined time interval characteristic of the damped equipment;

another comparator circuit for calculating the ratio R where $R=I_p/I_1$, and for comparing said ratio R with a predetermined limit value $R_L$; and means for activating or deactivating a visual indicator as a function of the signal coming from the other comparator circuit.

In an embodiment in accordance with the invention, the monitoring device comprises means for monitoring the operating state of said device and means for activating or deactivating at least one additional visual indicator.

The objects given to the invention are also achieved with the help of an aircraft of the rotorcraft or helicopter kind including at least one on-board monitoring device as described above.

The monitoring method in accordance with the invention presents the advantage of being extremely simple insofar as it suffices to look at an indicator, such as an indicator light, in order to determine the state of a damper system. This avoids any time-consuming work inspecting the sizes of cracks while carrying out maintenance.

Nor is there any need to wait for maintenance operations in order to monitor damping characteristics. Monitoring is performed continuously while in operation.

Another advantage of the monitoring method in accordance with the invention, lies in the simplicity and the compactness of the electronic means required for implementing it. The monitoring device in accordance with the invention presents component elements that, taken individually, are well known and inexpensive. The monitoring device in accordance with the invention is advantageously incorporated in a very compact electronics module.

Contrary to all expectation, the monitoring device in accordance with the invention enables a remarkable degree of reliability to be achieved in detecting a loss of damping characteristics.

BRIEF DESCRIPTION OF THE DRAWINGS

The invention and its advantages appear in greater detail from the following description of at least one embodiment or implementation given by way of non-limiting illustration with reference to the accompanying drawings, in which.

Elements that are structurally and functionally identical and that appear in more than one of the figures are given the same numerical or alphanumerical references in each of them.

DETAILED DESCRIPTION OF THE PREFERRED EMBODIMENT

Figure 1:
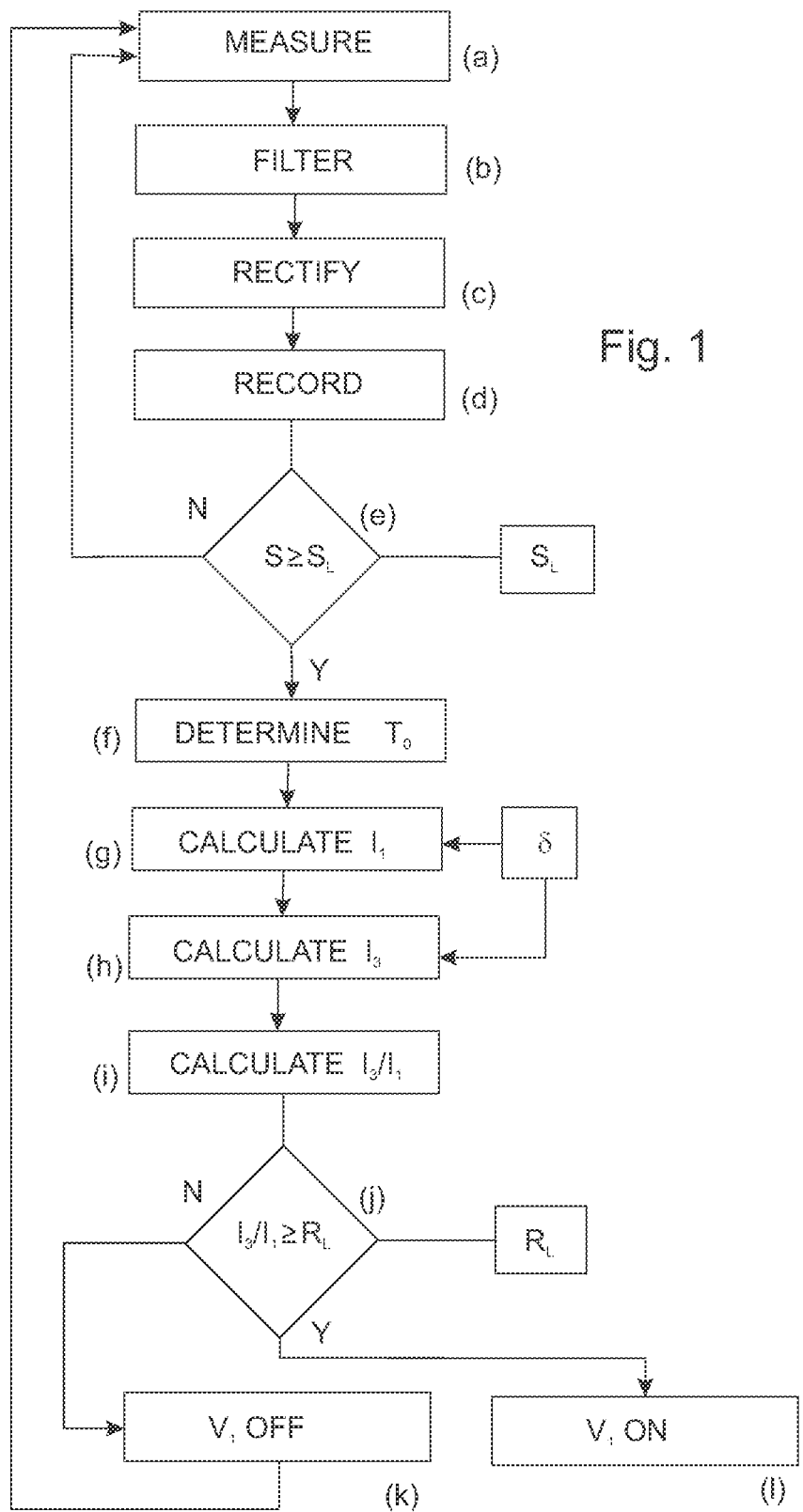
FIG. 1 is a flow chart of an implementation of the monitoring method in accordance with the invention.

FIG. 1 is a flow chart of an implementation of the method of monitoring the effectiveness of a damper system for damping the components of movements of an aircraft blade that result from the lead-lag resonant frequency $\omega_\delta$ of the blade, said damper system comprising two strength members that move relative to each other and that are connected together by means of a damper member. By way of example, the damper member is a viscoelastic material, a hydraulic actuator, or a hydro-elastic actuator, as described for example in documents FR 2 736 890, FR 2 629 163, or FR 2 592 696.

The pre-established lead-lag resonant frequency $\omega_\delta$ is initially calculated analytically as a function of the physical characteristics (masses, stiffnesses) of the parts of the damper system, and is then measured on an aircraft during prototype flights. The measured value is then corrected depending on the specific characteristics of the damper system. These characteristics are measured during the reception testing performed on each damper system. By way of example, on a rotor that is "soft in-plane", if the frequency of rotation is $\omega$, then the lead-lag resonant frequency $\omega_\delta$ typically has a value lying in the range 0.3 $\omega$ to 0.7 $\omega$.

The monitoring method consists, in a step a), in measuring the relative movements of the two strength members, and in a step b), in filtering the measurements in order to isolate those relating to the lead-lag resonant frequency of the blade.

The monitoring method then consists, in a step c), in rectifying the signal that results from the filtering, and in a step d), in recording the rectified signal S.

Thereafter the monitoring method consists, in a step e), in comparing the rectified signal S with a pre-established threshold value $S_L$. This threshold value $S_L$ is determined experimentally in order to avoid false alerts concerning the stiffness of the damper system.

So long as the rectified signal S does not exceed said threshold value $S_L$, the method returns to step a).

As soon as the rectified signal exceeds the threshold value $S_L$, an initial time $T_0$ is determined in a step f), and in a step g), an integral $I_1$ of the rectified signal is calculated from $T_0$ to $T_0+\delta$, where $\delta$ is a predetermined time interval that is characteristic of the damped equipment. The time interval $\delta$ is calculated from the lead-lag resonant frequency $\omega_\delta$ and the damping, e.g. as measured on aircraft during prototype flights. The value as calculated in this way is then corrected as a function of the characteristics specific to the damper system. During reception testing of a damper system, the characteristics may vary around a nominal value. The correction of the time interval $\delta$, consists for example in adjusting said interval as a function of the measurements taken.

By way of example, the time interval $\delta$ is a few tenths of a second.

The monitoring method then consists, in a step h), in calculating an integral $I_p$ of the rectified signal from $T_0$ to $T_0+p\delta$, where p is an integer equal to 2, 3, 4, or 5, and is preferably equal to 3.

The monitoring method then consists, in a step i), in calculating the ratio R, where $R=I_p/I_1$, and in a step j), in comparing the ratio R with a pre-established limit value $R_L$.

The limit value $R_L$ is known from the lead-lag resonant frequency $\omega_\delta$ and from the damping as measured on an aircraft in prototype flight. This value is then corrected as a function of the characteristics specific to the damper system. The limit value $R_L$ for the ratio R is thus determined theoretically and empirically in such a manner as to ensure that the rotor is stable so long as said limit value is not exceeded. The limit value $R_L$ as determined on purely theoretical grounds turns out to be greater than the value that is determined empirically. A correction is therefore necessary.

In a step k), if the ratio R is less than the limit value $R_L$, then the method returns to step a), whereas if the ratio R is greater than or equal to the limit value $R_L$, then, in a step l), an alert instruction $V_1$ is activated and delivered. This alert instruction $V_1$ thus corresponds to a failure of the damper system.

In a variant implementation in accordance with the invention, in step h), the method consists in calculating the integral $I_p$ of the rectified signal from $T_0+p\delta$ to $T_0+(p+1)\delta$, where p is an integer equal to 2, 3, 4, or 5, and is preferably equal to 3.

The value chosen for this integer depends for example on the nature of the rotor.

In an example in accordance with the invention, the method is implemented continuously on equipment while it is in operation.

The method consists in using pre-established values for the lead-lag resonant frequency $\omega_\delta$, for the threshold value $S_L$, and for the characteristic time interval $\delta$.

Figure 2:
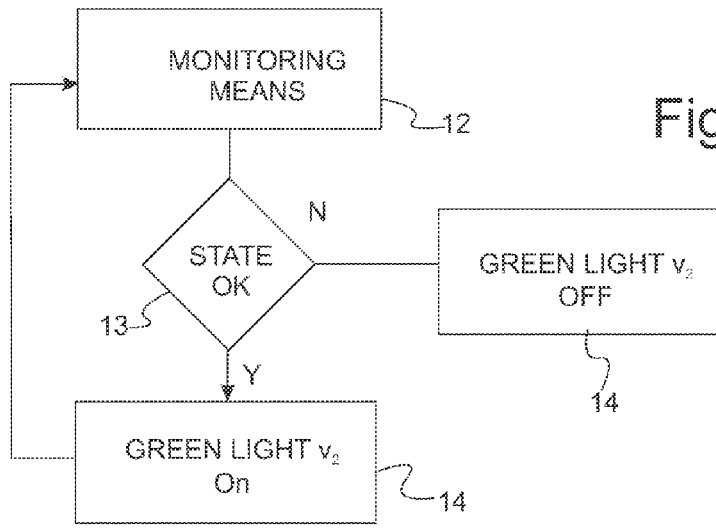
FIG. 2 is a logic diagram of an implementation of an additional stage of the monitoring method in accordance with the invention.

FIG. 2 is a logic diagram of an implementation of an additional stage of the monitoring method in accordance with the invention.

In this example implementation in accordance with the invention, the method consists in monitoring the operating state of the means implementing said monitoring method and in delivering at least one additional alert signal $V_2$ in the event of malfunction.

The method is advantageously based on using a self-contained electrical power supply.

Figure 3:
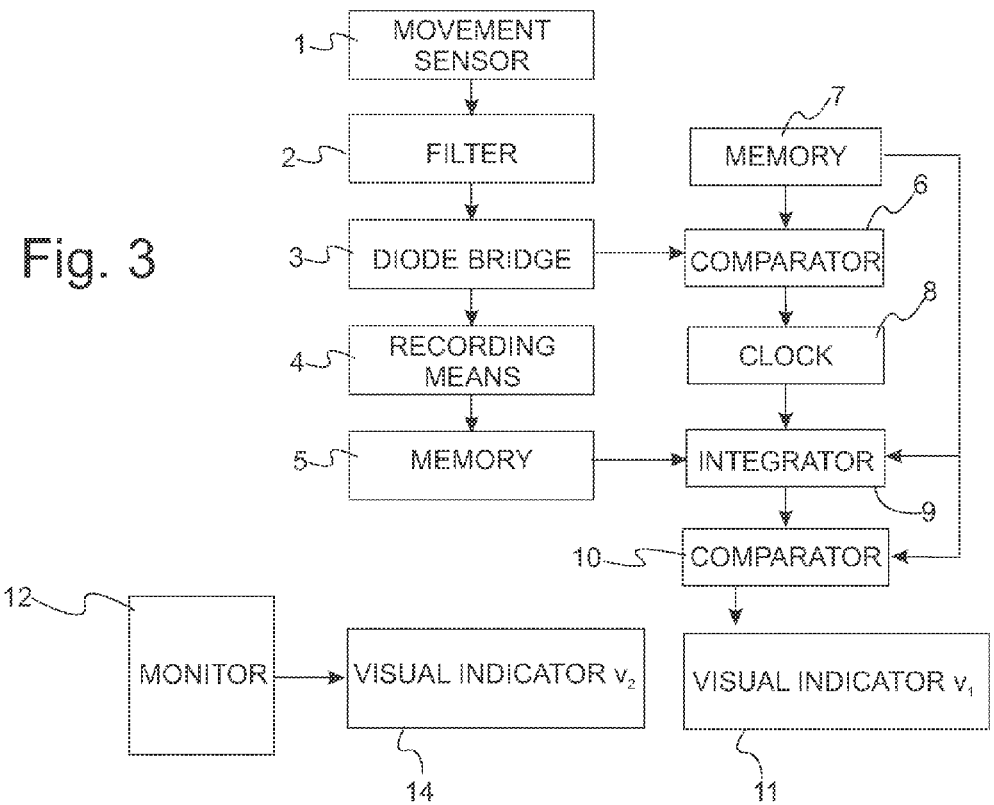
FIG. 3 is a diagram of a monitoring device for implementing the monitoring method in accordance with the invention.

FIG. 3 is a functional diagram of a monitoring device for implementing the monitoring method in accordance with the invention.

The monitoring device in accordance with the invention serves to monitor the effectiveness of a damper system for damping the movement components of aircraft equipment that results from the lead-lag resonant frequency $\omega_\delta$ of said equipment.

The damper system comprises two rigid strength members movable relative to each other and connected together by means of a damper member.

In order to implement the monitoring method in accordance with the invention, the monitoring device in accordance with the invention comprises a self-contained power supply unit and a movement sensor 1 for measuring the relative movements of the two strength members.

The monitoring device also includes a bandpass filter 2 for isolating the movement components of the strength members that result from the lead-lag resonant frequency $\omega_\delta$. The bandpass filter 2 is preferably a Butterworth type filter of order 6 or 8.

A diode bridge 3 is also provided in the monitoring device for rectifying the signal delivered by the bandpass filter 2.

The monitoring device also includes recording means 4 having a memory 5 for storing the values of the integrals $I_1$, $I_p$, and, where appropriate, the rectified signal S.

The monitoring device also includes a comparator circuit 6 for determining the time $T_0$ at which the value of the rectified and filtered signal S exceeds a threshold value $S_L$, with this relying on an additional memory 7 and a clock 8.

The monitoring device also includes an integrator circuit 9 for calculating the integral $I_1$ of the signal S from time $T_0$ to $T_0+\delta$ and the integral $I_p$ from $T_0$ to $T_0+p\delta$, where p is an integer lying in the range 2 to 5 inclusive, and is preferably equal to 3.

Another comparator circuit 10 is provided in the monitoring device to calculate the ratio R where $R=I_p/I_1$, and for comparing said ratio R with the limit value $R_L$. This ratio R may for example be calculated by a specific calculator unit.

The monitoring device also includes means for activating or deactivating a visual indicator 11 as a function of the signal coming from the other comparator circuit 10.

By way of example, the monitoring device includes a monitor 12 for monitoring the operating state of said device and means for activating or deactivating at least one additional visual indicator 14.

By way of example, the visual indicator 11 is a red light that is activated when it is necessary to replace the damper system, i.e. when the ratio R is greater than the limit value $R_L$. This light can no longer be deactivated until the damper system has been replaced.

By way of example, the additional visual indicator 14 is a green light that is activated so long as the monitoring device finds a good operating state and that is deactivated as soon as a malfunction of said monitoring device is detected by the monitoring means. By way of example, such a malfunction may be a failure of the self-contained electrical power supply.

The signal S is a damped and rectified sinewave signal and the values of the integrals $I_p$ are representative of the energy associated with the resonant movement of the blade. Thus, the greater the damping, the closer the ratio R is to 1, and the weaker the damping, the closer the ratio R is to p. A drop in the stiffness or the damping of the damper system is thus observed in the ratio R.

For a given damper system, at the beginning of its lifetime, the ratio R is known and the more the stiffness and the damping of said system decrease, the more the value of the ratio R increases.

After theoretical and experimental determination, it is known that as from a certain loss of stiffness and damping, the rotor becomes unstable. Such a situation must be avoided. Consequently, the limit value $R_L$ is selected to have a determined margin relative to the ratio that corresponds to instability. The surveillance range of the visual indicator 11 should be organized so that the damper system can be replaced before the ratio R reaches its value that corresponds to instability.

Naturally, the present invention may be subjected to numerous variants as to its implementation. Although several embodiments are described, it will readily be understood that it is not conceivable to identify exhaustively all possible embodiments. It is naturally possible to envisage replacing any of the means described or any step of the implementation described by equivalent means or by an equivalent step without going beyond the ambit of the present invention.

What is claimed is:

1. A method of monitoring the effectiveness of a damper system for damping the movement components of equipment of an aircraft that result from the lead-lag resonant frequency ($\omega_\delta$) of said equipment, said damper system including two strength members that are movable relative to each other and that are connected together by a damper member, the method comprising:
   a) measuring, with a movement sensor, the relative movements of the two strength members;
   b) filtering, with an electronic filter, the measurements to isolate those that relate to the lead-lag resonant frequency of the equipment;
   c) rectifying, with an electronic circuit, the signal that results from the filtering;
   d) recording the rectified signal (S);
   e) comparing, with a comparator circuit, the rectified signal (S) with a predetermined threshold value ($S_L$) and returning to step a) so long as the rectified signal (S) does not exceed said threshold value ($S_L$);
   f) determining an initial time instant $T_0$ as soon as the rectified signal exceeds the threshold value ($S_L$);
   g) calculating, with an integrator circuit, an integral $I_1$ of the rectified signal from $T_0$ to $T_0+\delta$, where $\delta$ is a predetermined time interval characteristic of the damped equipment;
   h) calculating, with the integrator circuit, an integral $I_p$ of the rectified signal from $T_0$ to $T_0+p\delta$, where p is an integer equal to 2, 3, 4, or 5;
   i) calculating a ratio R where $R=I_p/I_1$;
   j) comparing the ratio R with a predetermined limit value $R_L$;
   k) returning to step a) if the ratio R is less than the limit value $R_L$;
   l) activating and delivering an alert instruction ($V_1$) if the ratio R is greater than or equal to the limit value $R_L$, said alert instruction corresponding to a failure of the damper system; and
   m) using an electrical power supply to operate at least the filter and the circuits.

2. An effectiveness monitoring method according to claim 1, further comprising using an integer p=3.

3. An effectiveness monitoring method according to claim 1, that is implemented continuously on equipment while in operation.

4. An effectiveness monitoring method according to claim 1, further comprising using pre-established and recorded values for the lead-lag resonant frequency ($\omega_\delta$), for the threshold value ($S_L$), for the limit value $R_L$, and for the characteristic time $\delta$.

5. An effectiveness monitoring method according to claim 1, wherein the aircraft equipment is a rotor blade.

6. An effectiveness monitoring method according to claim 1, further comprising monitoring the operating state of the means implementing said monitoring method and delivering at least one additional alert signal ($V_2$) in the event of malfunction.

7. An effectiveness monitoring method according to claim 1, wherein the limit value $R_L$ is initially determined theoretically and is subsequently corrected as a function of experimental results from flight testing.

8. A method of monitoring the effectiveness of a damper system for damping the movement components of equipment of an aircraft that result from the lead-lag resonant frequency ($\omega_\delta$) of said equipment, said damper system including two strength members that are movable relative to each other and that are connected together by a damper member, the method comprising:
   a) measuring, with a movement sensor, the relative movements of the two strength members;
   b) filtering, with an electronic filter, the measurements to isolate those that relate to the lead-lag resonant frequency of the equipment;
   c) rectifying, with an electronic circuit, the signal that results from the filtering;
   d) recording the rectified signal (S);
   e) comparing, with a comparator circuit, the rectified signal (S) with a predetermined threshold value ($S_L$) and returning to step a) so long as the rectified signal (S) does not exceed said threshold value ($S_L$);

f) determining an initial time instant $T_0$ as soon as the rectified signal exceeds the threshold value ($S_L$);

g) calculating, with an integrator circuit, an integral $I_1$ of the rectified signal from $T_0$ to $T_0+\delta$, where $\delta$ is a predetermined time interval characteristic of the damped equipment;

h) calculating, with the integrator circuit, an integral Ip of the rectified signal from $T_0+p\delta$ to $T_0+(p+1)\delta$, where p is an integer equal to 2, 3, 4, or 5;

i) calculating a ratio R where $R=I_p/I_1$;

j) comparing the ratio R with a predetermined limit value $R_L$;

k) returning to step a) if the ratio R is less than the limit value $R_L$;

l) activating and delivering an alert instruction ($V_1$) if the ratio R is greater than or equal to the limit value $R_L$, said alert instruction corresponding to a failure of the damper system; and m) using an electrical power supply to operate at least the filter and the circuits.

9. An effectiveness monitoring method according to claim 8, further comprising using an integer p=3.

10. An effectiveness monitoring method according to claim 8, that is implemented continuously on equipment while in operation.

11. An effectiveness monitoring method according to claim 8, further comprising using pre-established and recorded values for the lead-lag resonant frequency ($\omega_\delta$), for the threshold value ($S_L$), for the limit value $R_L$, and for the characteristic time $\delta$.

12. An effectiveness monitoring method according to claim 8, wherein the aircraft equipment is a rotor blade.

13. An effectiveness monitoring method according to claim 8, further comprising monitoring the operating state of the means implementing said monitoring method and delivering at least one additional alert signal ($V_2$) in the event of malfunction.

14. An effectiveness monitoring method according to claim 8, wherein the limit value $R_L$ is initially determined theoretically and is subsequently corrected as a function of experimental results from flight testing.

15. A device to monitor the effectiveness of a damper system for damping the movement components of equipment of an aircraft resulting from the lead-lag resonant frequency ($\omega_\delta$) of said equipment, said damper system including two strength members that are movable relative to each other and connected together by a damper member, the device comprising:

a self-contained power supply unit;

a movement sensor for measuring the relative movements of the strength members;

a bandpass filter for isolating the movement components of the strength members that result from the lead-lag resonant frequency ($\omega_\delta$);

a diode bridge for rectifying the signal delivered by the bandpass filter;

recording means including a memory for storing the rectified signal;

a comparator circuit for determining the time $T_0$ at which the value of the rectified and filtered signal exceeds a predetermined threshold value ($S_L$), making use of an additional memory and a clock;

an integrator circuit for calculating the integral $I_1$ of the signal from time $T_0$ to $T_0+\delta$ and the integral $I_p$ from $T_0$ to $T_0+p\delta$ or from $T_0+p\delta$ to $T_0+(p+1)\delta$, where p is an integer equal to 2, 3, 4, or 5, and where $\delta$ is a predetermined time interval characteristic of the damped equipment;

another comparator circuit for calculating the ratio R where $R=I_p/I_1$, and for comparing said ratio R with a predetermined limit value $R_L$; and means for activating or deactivating a visual indicator as a function of the signal coming from the other comparator circuit.

16. A device according to claim 15, including means for monitoring the operating state of said device and means for activating or deactivating at least one additional visual indicator.

\* \* \* \* \*